Aug. 18, 1953     S. W. SAM     2,648,928
FISHING DEVICE
Filed Nov. 14, 1951
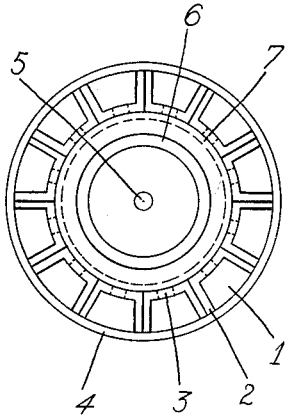
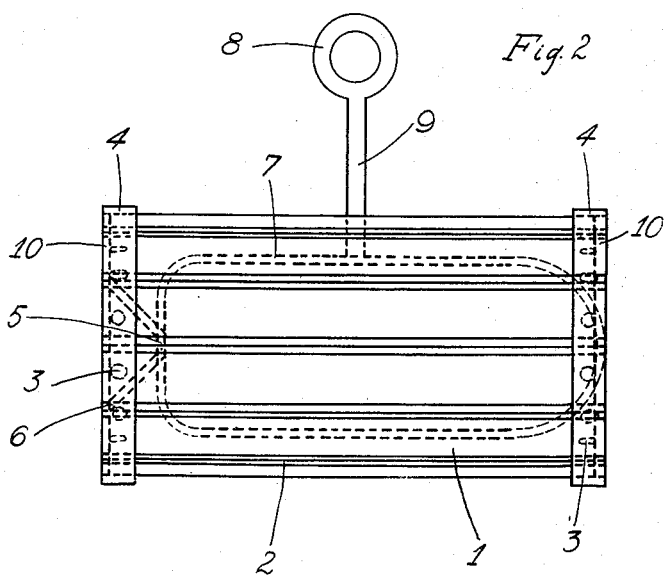
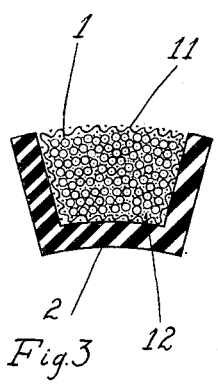
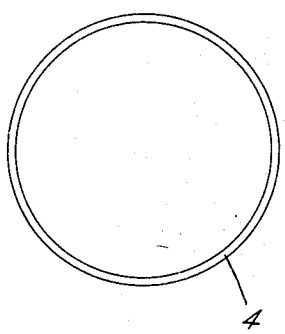
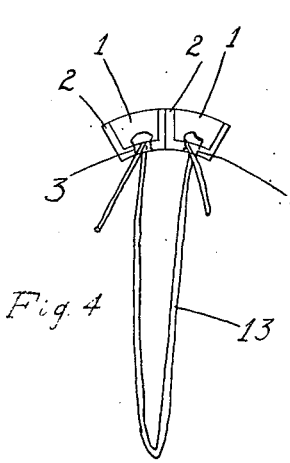
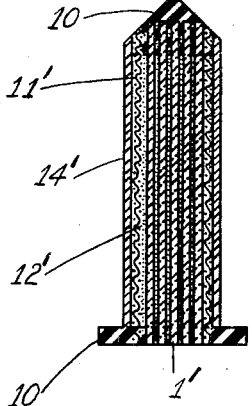
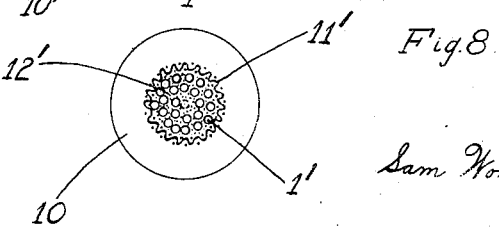
INVENTOR.
Sam Women Sam Patented Aug. 18, 1953

2,648,928

UNITED STATES PATENT OFFICE 2,648,928

FISHING DEVICE

Sam Women Sam, Chicago, Ill.

Application November 14, 1951, Serial No. 256,249

12 Claims. (Cl. 43—41)

The invention relates to a fishing device which is a substitute for a fish hook. This application is a continuation-in-part of my copending application of the same title, Serial Number 138,574, filed January 14, 1950, now abandoned.

An object of the invention is to devise a fishing device which is more effective than a fish hook.

Another object is to devise a fishing device which catches fish unharmed so they may be carried home alive in a pail of water and be kept alive indefinitely.

Another object is to devise a fishing device which can hold bait such as various kinds of worms, minnows, crabs et cetera alive and unharmed at least until the fishing device is snapped by a fish and which moreover can hold bait alive oftentimes even after the fishing device is snapped by a fish.

Another object is to devise a fishing device which moves life-like in unison with the live bait it contains and which has the appearance of live bait.

These are long sought advantages in angling in view of the fact that the movement of bait is a more important element of attraction than the form of the bait because the sight of fish is poor even near the surface of water where illumination is best as is evidenced by the frequent snapping by fish of objects foreign to the nature of edible bait on or near the surface of water. This advantage is amplified when the movements of the bait are life-like and when the appearance of the bait is also life-like.

Other objects and advantages become apparent as the description proceeds.

I attain these objects by a device illustrated in the accompanying drawing, in which—

Figure 1 is an end view of the preferred form of the fishing device;

Figure 2 is a longitudinal view of the device shown in Figure 1;

Figure 3 is a cross section through one longitudinal, radial segment bundle 1;

Figure 4 is an end view of two adjacent, longitudinal, radial segment bundles 1 showing them joined together by a long thread 13;

Figure 5 is a vertical axial sectional view through a modified form of fishing device;

Figure 6 is an end view of the device shown in Figure 5;

Figure 7 is a front view of the band 4; and

Figure 8 is a side view of the band 4.

In Figures 1 and 2, there is shown a composite cylindrical tube formed by coaxial, longitudinal, radial, equal segment bundles 1 which are like strips. Each radial segment bundle 1 consists of a bundle of coaxial, straight, parallel, closely aggregated, coterminous, equal filaments of glass. Each radial segment bundle 1 is tightly covered by a net receptacle 11 made of glass filaments. Each radial segment bundle 1 and its net receptacle 11 are imbedded in an adhesive 12. Each radial segment bundle 1 and its net receptacle 11 and their adhesive 12 lie within a channel container 2 made of supple soft rubber or a substitute for rubber or elastomeric vinyl-chloride acetate or other suitable material. A supple, elastic membranous sac 7 having a small opening 5 and a funnel-shaped mouth 6 is contained within the hollow-axial space of the composite tube formed by the covered imbedded radial segment bundles 1 together with their channel containers 2. The sac 7 is adapted to hold live bait such as a minnow or worm and may have a form and size corresponding to the bait and may be open at both ends. A vertical suspending line 9 having a loop 8 at its end is fixed to the sac 7 and penetrates one of the radial segment bundles 1 and its net receptacle 11 and its channel container 2. The suspending line 9 may be made of soft rubber or glass filaments or other suitable material. This form of the fishing device is adapted to be suspended in a horizontal position at the bottom end of suspending line 9. This form of the fishing device may be without the adhesive 12 with some disadvantage but yet be effective, operable. A margin of each segment bundle 1 together with its net receptacle 11 at or near their longitudinal ends is imbedded in a solid substance such as supple soft rubber or a substitute for rubber or elastomeric vinyl-chloride acetate. Both ends of the channel containers 2 have holes 3 which serve the purpose of joining each channel container 2 with both its adjacent channel containers 2 by means of a long thread 13 made of glass filaments as shown in Figure 4. The function of thread 13 is to join together adjacent channel containers 2 and to accomplish it each end of thread 13 is securely fastened to the hole of each adjacent channel container 2.

The radial segment bundles 1 together with their net receptacles 11 are adapted to be clung to by the teeth of fish biting them and are provided with a suitable adhesive 12 which aids the clinging action but is not indispensable for that purpose as the device is effective without it. The adhesive 12 should be strongly adhesive to the glass filaments and also adhesive to the teeth of fish while immersed in water within the range of temperature of the water experienced in ordinary fishing, angling of the character described, namely, as done with fish hooks. It is essential that at least a thin coating of the adhesive substance should persistently adhere to the glass filaments a sufficient length of time to enable the device to be effective to catch fish. To this end, it would be desirable, if practicable and consistent with the other requirements for the adhesive to be practically insoluble in water or, if soluble, to be protected from being removed from the glass filaments by the dissolving action of the water even slightly or, at least, from being removed too fast so as to render the device ineffective from the standpoint of proper standards. Dextrine is extremely cohesive and is extremely adhesive to the surface of glass filaments and the teeth of fish while immersed in water. Although it is soluble in water nevertheless a thin coating adheres to each filament of glass for a sufficient length of time to render the device effective, operable to catch fish. A suitable emulsion of dextrine suspended in water (the emulsifying substance being insoluble in water) would at least retard if not prevent entirely removal of the coating of dextrine from the surface of each filament of glass due to the dissolving action of water. The emulsifying substance may be castor oil or linseed oil or other suitable substance. Other adhesives such as starch adhesives, glucose, molasses, casein, animal glue or water insoluble emulsions of these adhesives may also be used. The adhesive may be dextrine suspended in water and protected from too rapid removal due to the dissolving action of water by being coated with a water insoluble substance such as wax coating 14' shown in Figure 5.

In Figures 5 and 6, there is shown a modified form of the fishing device having looped end 8' and a suspending line 9'. The cylindrical bundle 1 of longitudinal glass filaments is tightly covered by the net receptacle 11' and both are imbedded in a suitable adhesive 12'. The bundle 1 together with its net receptacle 11' and adhesive 12' are coated with a wax coating 14'. The longitudinal ends of the bundle 1 of glass filaments together with its net receptacle 11' are imbedded in a solid substance such as supple soft rubber 10. Bait such as a worm may be needled, strung on and around wax coating 14' by way of the suspending line 9.

The thin band 4 may be made of paper and should be readily rupturable while immersed in water in response to the opening of the mouth of a fish biting the preferred form of the fishing device shown in Figures 1 and 2 so that a portion of the composite tube composed of radial segment bundles 1 together with their net receptacles 11 and their channel containers 2 is enabled to cling to the teeth in the top of the wide open mouth of a fish while simultaneously the opposite portion of the composite tube is enabled to cling to the teeth in the bottom of the wide open mouth of the fish. The thread 13 should be long enough to enable such clinging. Thin band 4 may be seamless or otherwise. It may be formed and assembled by a strip of paper having an adhesive coating along one margin on one side. Both bands 4 may be wide enough so that together they cover the axial length of the entire composite tube. Only one band 4 may be used. The purpose of thin band 4 is to hold together, intact the composite tube composed of otherwise loose radial segment bundles 1.

I claim:
1. A fishing device comprising a plurality of longitudinal elongated radially and circumferentially disposed U-shaped channeled containers defining a tube, means for securing adjacent sides of the containers in longitudinally close relation, a net receptacle having a bundle of filaments disposed therein and bonded together with said net receptacle by an adhesive in each of said containers, means for securing said receptacles in said containers, and means within the tube and extending therefrom for attachment to a fishing line.

2. A fishing device comprising a plurality of longitudinally elongated radially and circumferentially disposed U-shaped channeled containers defining a tube, means for securing adjacent sides of the containers in longitudinally close relation, a net receptacle having a bundle of filaments disposed therein and flexibly bonded together with said net receptacle by an adhesive in each of said containers, a circumferential rupturable holding band disposed about said containers and receptacles, and means within the tube and extending therefrom for attachment to a fishing line.

3. A fishing device comprising a plurality of longitudinal elongated radially and circumferentially disposed U-shaped channeled radially separable interconnected containers defining a tube, a pliable sack contained within said tube, said sack adapted to receive and to hold bait, means for securing adjacent sides of said containers in longitudinally close relation, a net receptacle having a bundle of filaments disposed therein and flexibly bonded together with said net receptacle by an adhesive in each of said containers, a circumferential rupturable holding band disposed about said containers and receptacles, and means within the tube and extending therefrom for attachment to a fishing line.

4. A fishing device comprising a channel member of elastic material having therein and secured thereto a net receptacle, an adhesive, a plurality of filaments disposed therein and adhesively bonded to each other and to said net receptacle by said adhesive, and means for attachment of the device to a fishing line.

5. A fishing device comprising a channel member having therein and secured thereto a net receptacle, an adhesive, a plurality of filaments disposed therein and adhesively bonded to each other and to said net receptacle by said adhesive, and means for attachment of the device to a fishing line.

6. A fishing device comprising a net receptacle, an adhesive, a plurality of filaments disposed therein and bonded to each other and to said net receptacle by said adhesive, and means extending from the receptacle for attachment to a fishing line.

7. A fishing device comprising a net receptacle, an adhesive, a bundle of closely aggregated longitudinally disposed filaments contained therein and bonded to each other and to said net receptacle by said adhesive, and means extending from the receptacle for attachment to a fishing line.

8. A fishing device comprising a plurality of longitudinal elongated radially and circumferentially disposed U-shaped channeled containers defining a tube, means for securing adjacent sides of the containers in longitudinally close relation, a net receptacle having a bundle of filaments disposed therein in each of said containers, an adhesive for bonding said filaments to each other, means for securing said receptacles in said containers, and means within the tube and extending therefrom for attachment to a fishing line.

9. A fishing device comprising a plurality of longitudinally elongated radially and circumferentially disposed U-shaped channeled containers defining a tube, means for securing adjacent sides of the containers in longitudinally close relation, a net receptacle having a bundle of filaments disposed therein, an adhesive for bonding said filaments to each other in each of said containers, circumferential rupturable holding bands disposed about said containers and receptacles, and means within the tube and extending therefrom for attachment to a fishing line.

10. A fishing device comprising a plurality of longitudinal elongated radially and circumferentially disposed U-shaped channeled radially separable interconnected containers defining a tube, a pliable sack contained within said tube, said sack adapted to hold bait, means for securing adjacent sides of said containers in longitudinally close relation, a net receptacle having a bundle of filaments disposed therein in each of said containers, circumferential rupturable holding bands disposed about said containers and receptacles, and means within the tube and extending therefrom for attachment to a fishing line.

11. A fishing device comprising a channel member of elastic material having therein and secured thereto a net receptacle, a plurality of filaments disposed therein, and means for attachment of the device to a fishing line.

12. A fishing device comprising a channel member having therein and secured thereto a net receptacle, a plurality of filaments disposed therein, and means for attachment of the device to a fishing line.

SAM WOMEN SAM.

References Cited in the file of this patent

UNITED STATES PATENTS

| Number | Name | Date |
|---|---|---|
| 1,405,740 | Riza | Feb. 7, 1922 |
| 2,216,929 | Zander et al. | Oct. 8, 1940 |
| 2,407,011 | Huppert | Sept. 3, 1946 |